(12) United States Patent
Wang et al.

(10) Patent No.: US 7,546,991 B2
(45) Date of Patent: Jun. 16, 2009

(54) DISPLAY DEVICE

(75) Inventors: Wen-Yen Wang, Taipei County (TW); Wen-Hung Huang, Taipei County (TW); Tien-Teng Yang, Taipei County (TW); Yu-Hui Chu, Taipei (TW)

(73) Assignee: Hannspree, Inc., Taipei (TW)

(*) Notice: Subject to any disclaimer, the term of this patent is extended or adjusted under 35 U.S.C. 154(b) by 244 days.

(21) Appl. No.: 11/736,779

(22) Filed: Apr. 18, 2007

(65) Prior Publication Data

US 2008/0116328 A1    May 22, 2008

(30) Foreign Application Priority Data

Nov. 14, 2006    (TW) ................ 95142045 A (51) Int. Cl.
*A47F 5/00* (2006.01)
(52) U.S. Cl. .............. 248/125.9; 248/125.1; 361/681
(58) Field of Classification Search ........... 248/917, 248/919, 920, 418, 158, 125.1, 125.7, 676, 248/176.3, 511, 519, 521, 122.1; 361/681
See application file for complete search history.

(56) References Cited

U.S. PATENT DOCUMENTS

| | | | | |
|---|---|---|---|---|
| 3,559,942 A | * | 2/1971 | Lucasey | 248/278.1 |
| 4,306,743 A | * | 12/1981 | Hinshaw et al. | 285/260 |
| 5,893,541 A | * | 4/1999 | Michaelson | 248/158 |
| 6,080,089 A | * | 6/2000 | Nicholson | 482/83 |
| 6,370,020 B1 | * | 4/2002 | Toukairin | 361/681 |
| 6,499,704 B2 | * | 12/2002 | Oddsen, Jr. | 248/125.1 |
| 6,938,871 B1 | * | 9/2005 | Carlson | 248/519 |
| D563,914 S | * | 3/2008 | Chiu | D14/126 |
| 7,460,361 B2 | * | 12/2008 | Yiu | 361/681 |
| 2004/0084579 A1 | * | 5/2004 | Lee et al. | 248/125.1 |

\* cited by examiner

*Primary Examiner*—J. Allen Shriver, II
*Assistant Examiner*—Alaeddin Mohseni
(74) *Attorney, Agent, or Firm*—Thomas, Kayden, Horstmeyer & Risley (57) ABSTRACT

A swiveling display device, capable of easy assembly and disassembly, includes a main body, a supporting arm joined to the main body, and a base having a positioning hole. The supporting arm is inserted into and detachably engages the positioning hole in such a manner that the supporting arm can rotate within a predetermined range.

10 Claims, 8 Drawing Sheets

DISPLAY DEVICE

BACKGROUND OF THE INVENTION

1. Field of the Invention

The invention relates to a display device, and more particularly to a display device capable of easy assembling and disassembling and swiveling.

2. Description of the Related Art

Most conventional liquid crystal displays can be tilted but not swiveled. Some conventional liquid crystal displays capable of swiveling cannot be easily assembled or disassembled due to their complicated structure.

BRIEF SUMMARY OF INVENTION

The invention provides swiveling display devices, capable of easy assembly and disassembly. An exemplary embodiment of a display device comprises a main body, a supporting arm joined to the main body, and a base having a positioning hole. The supporting arm is inserted into and detachably engaged by the positioning hole such that the supporting arm can rotate within a predetermined range.

The supporting arm has a slot, the base has a spring plate disposed in the positioning hole, and the spring plate has a hook. When the slot engages the hook, the supporting arm is engaged by the positioning hole. When the spring plate is deformed by pressure, the hook releases the slot, thus, the supporting arm is detached from the positioning hole.

The slot has a predetermined width at the periphery of the supporting arm, thus, when the positioning hole engages the supporting arm, the supporting arm can rotate.

The supporting arm is hollow and has an inner surface and a protrusion disposed on the inner surface. The base has a post disposed in the positioning hole and the positioning pole has a recess. When the supporting arm engages the positioning hole, the supporting arm holds the post in such a manner that the inner surface abuts the post and the protrusion engages the recess.

The recess has a first lateral surface, a second lateral surface separated from the first lateral surface by a predetermined distance and a bottom surface connecting the first and second lateral surfaces. When the supporting arm holds the post and the inner surface abuts the post, the protrusion abuts the bottom surface. When the supporting arm rotates relative to the positioning hole, the protrusion abuts either the first lateral surface or the second lateral surface, which limits the supporting arm to rotating in a range defined by the first and second lateral surfaces.

The protrusion has a notch, and the bottom surface has a projecting portion. When the notch holds the projecting portion, the supporting arm is positioned at a specific position.

The base has a plurality of ribs disposed on walls of the positioning hole, which extend along an axial direction of the positioning hole. When the supporting arm is inserted into the positioning hole, the supporting arm abuts the ribs.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
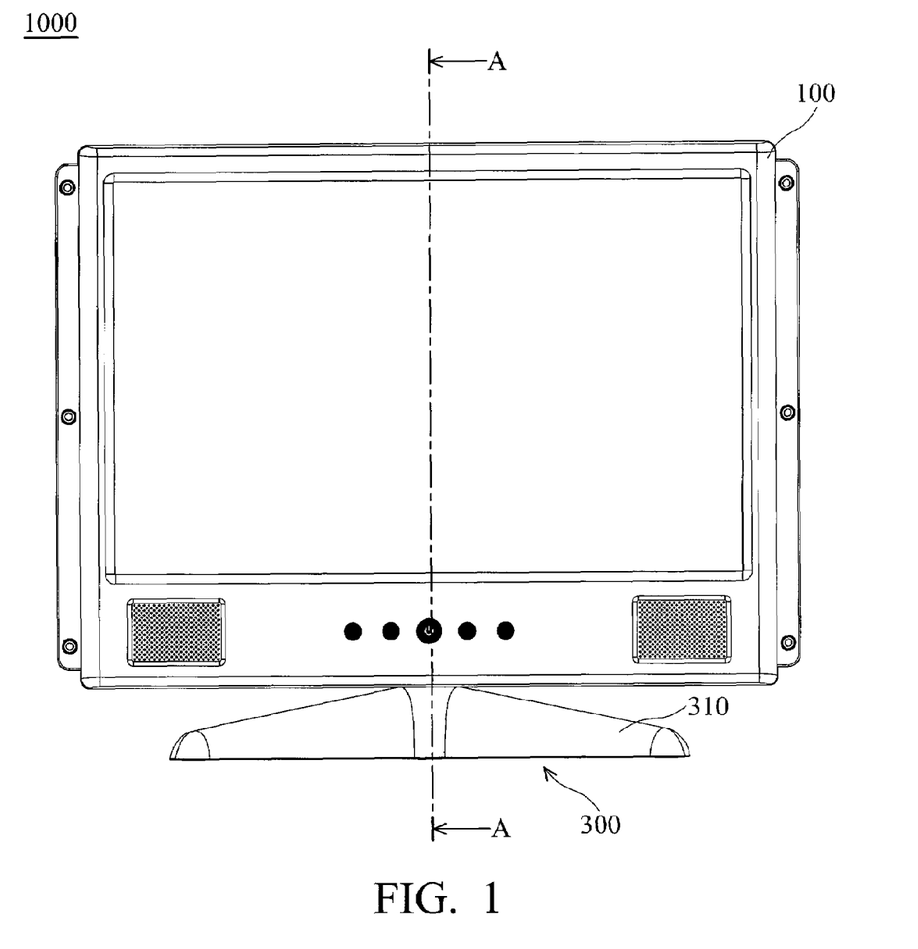
FIG. 1 is a front view of a display device of the invention.
Figure 2:
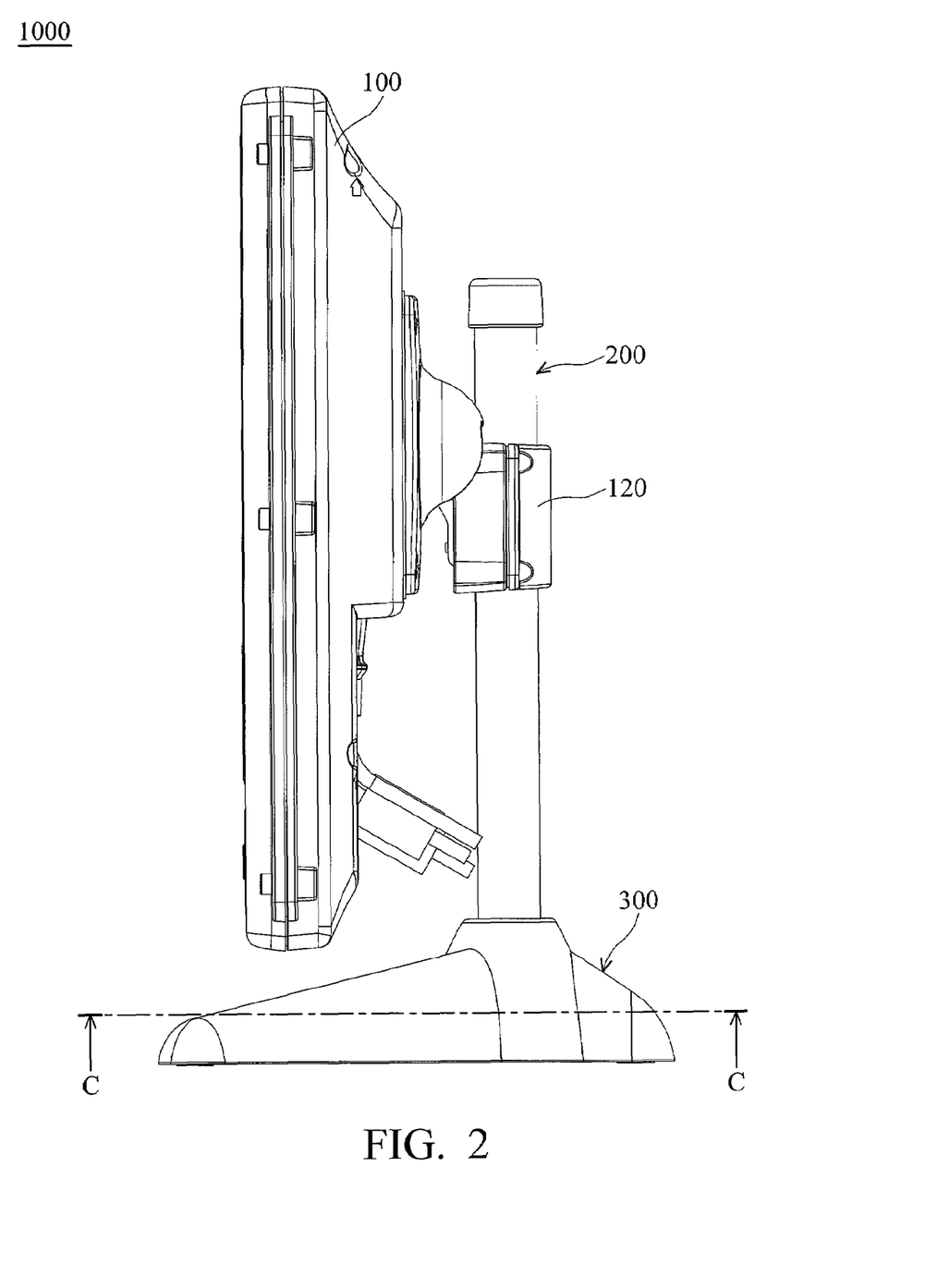
FIG. 2 is a side view of a display device of the invention.

Referring to FIGS. 1 and 2, a display device 1000 of the invention comprises a main body 100, a supporting arm 200 and a base 300. In FIG. 2, the main body 100 is joined and fixed to the supporting arm 200 by a connecting mechanism 120. In this embodiment, the supporting arm 200 has a tube-like shape. The supporting arm 200 is hollow and inserted into a base 300 which has extending arms 310 extending forward to form a larger bottom area, whereby the main body 100 is capable of standing stably on a desk or other flat surface.

Figure 3:
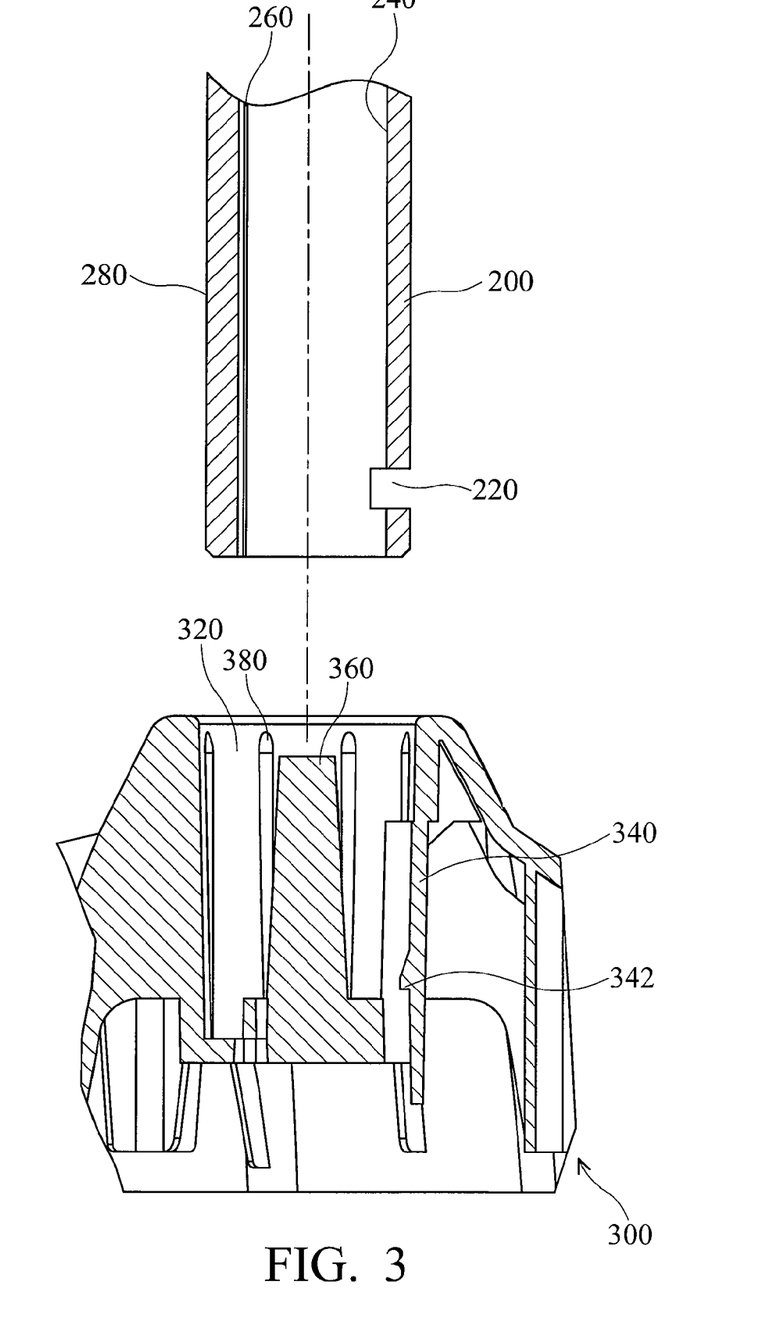
FIG. 3 is an exploded view of a cross section along the line A-A of FIG. 1.

Referring to FIG. 3, a slot 220 formed on the tube-like supporting arm 200 near one end thereof has a predetermined width at the periphery of the tube. The supporting arm 200 has an inner surface 240 from which a protrusion 260 extends along the axial direction of the supporting arm 260.

Figure 4:
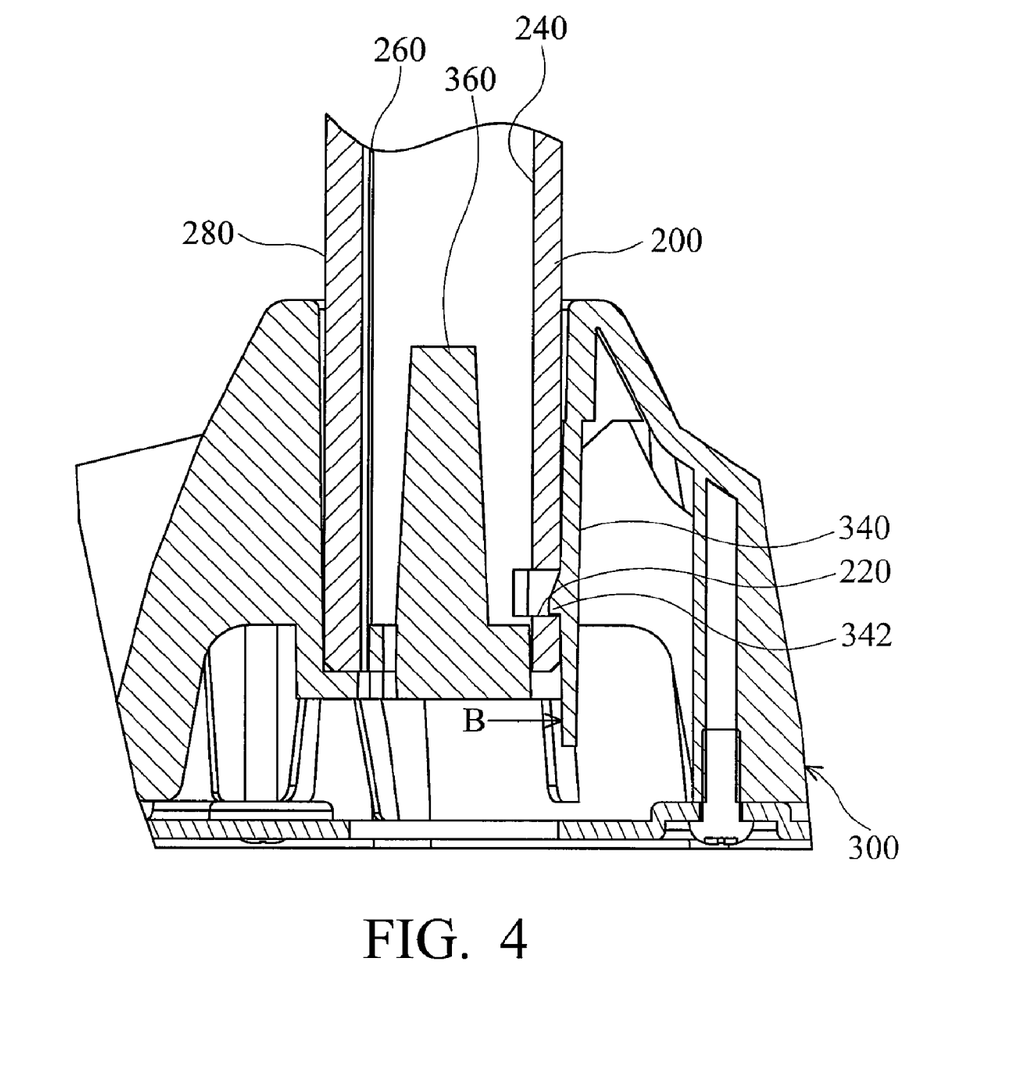
FIG. 4 shows a cross section along the line A-A of FIG. 1.

In FIG. 3, the extending arms 310 are omitted for clarity. The base 300 has a positioning hole 320 formed from the top to the bottom of the base 300. A spring plate 340 is formed extending axially from the rim and parallel to the inner wall of the positioning hole 320. A hook 342 disposed on the spring plate 340, projects from the spring plate 340 and corresponds to the slot 220 of the supporting arm 200. A post 360 is disposed at the center of the positioning hole 320. A plurality of ribs 380 disposed on the inner wall of the positioning hole 320 extends in parallel along the axial direction of the positioning hole 320. When the supporting arm 200 is inserted into the positioning hole 320, the inner surface 240 of the supporting arm 200 holds the post 360 and the outer surface 280 of the supporting arm 200 abuts the ribs 380. At this time the hook 342 engages the slot 220, whereby the supporting arm 200 is positioned in the positioning hole 320 as shown in FIG. 4. Because the slot 220 has a predetermined width, when the supporting arm 200 engages the positioning hole 320, the supporting arm 200 can rotate with respect to the positioning hole 320, thus, the main body 100 can swivel. The supporting arm 200 is extracted from the positioning hole 320, by exerting pressure on and pushing the spring plate 340 in the direction B through the base 300 to release the hook 342 from the slot 220. Thus, the supporting arm 200 is extracted from the positioning hole 320 of the base 300. The ribs 380 enable the outer surface 280 of the supporting arm 200 to make line contact with the positioning hole 320, thus, friction between the supporting arm 200 and the positioning hole 320 is reduced to ease disassembly.

Figure 5:
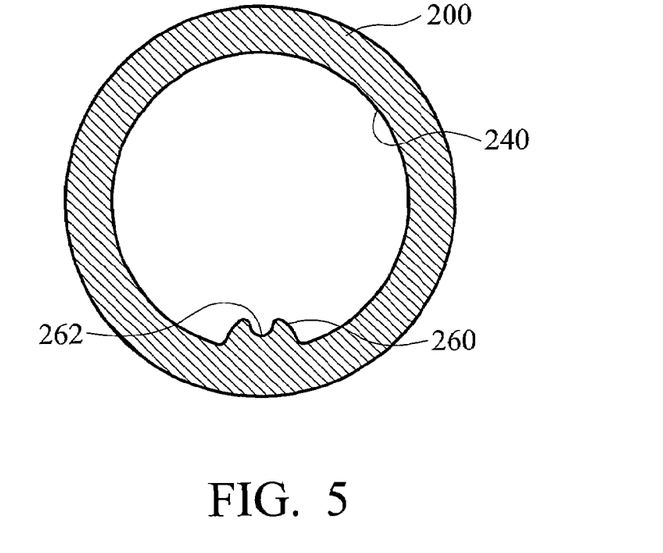
FIG. 5 shows a cross section of a supporting arm of the invention.
Figure 6:
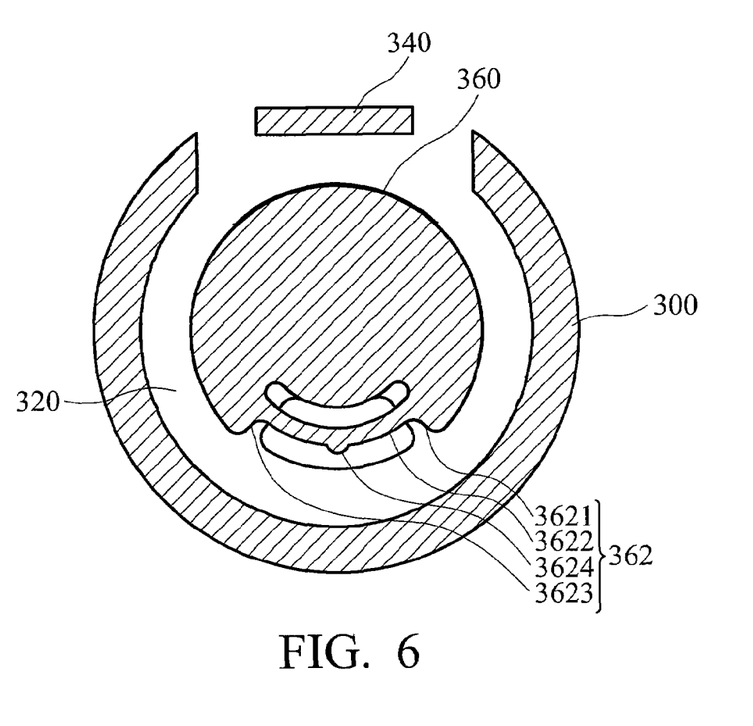
FIG. 6 shows a cross section of a base of the invention.

Referring to FIGS. 5 and 6, a protrusion 260 is disposed on the inner surface 240. A notch 262 is formed at the middle of the protrusion 260. A recess 362 formed on the post 360 comprises a first lateral surface 3621, a bottom surface 3622 and a second lateral surface 3623. The first lateral surface 3621 and the second lateral surface 3623 are connected to the bottom surface 3622, and the first lateral surface 3621 is separated from the second lateral surface 3623 by a predetermined distance. A projecting portion 3624 is formed at the center of the bottom surface 3622.

Figure 7A:
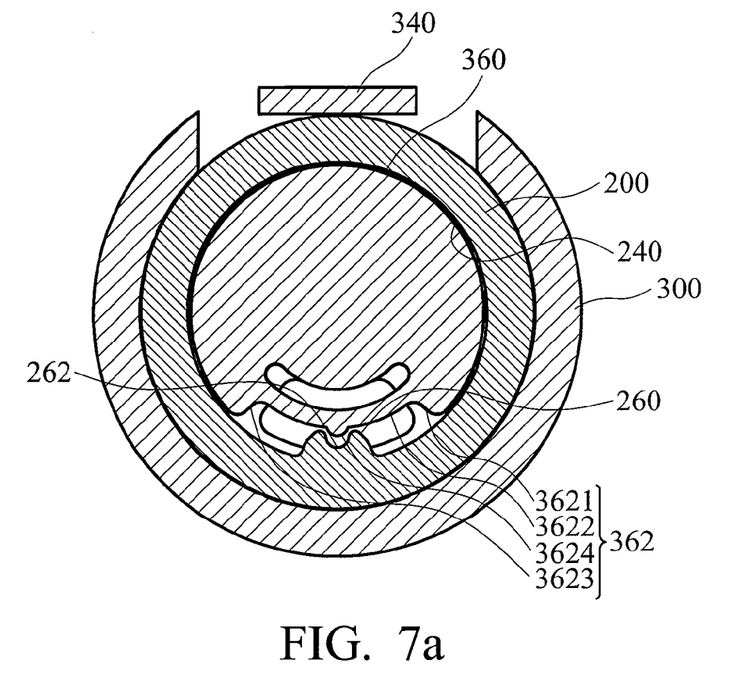
FIGS. 7a, 7b and 7c show cross sections of the supporting arm joined to the base.
Figure 7B:
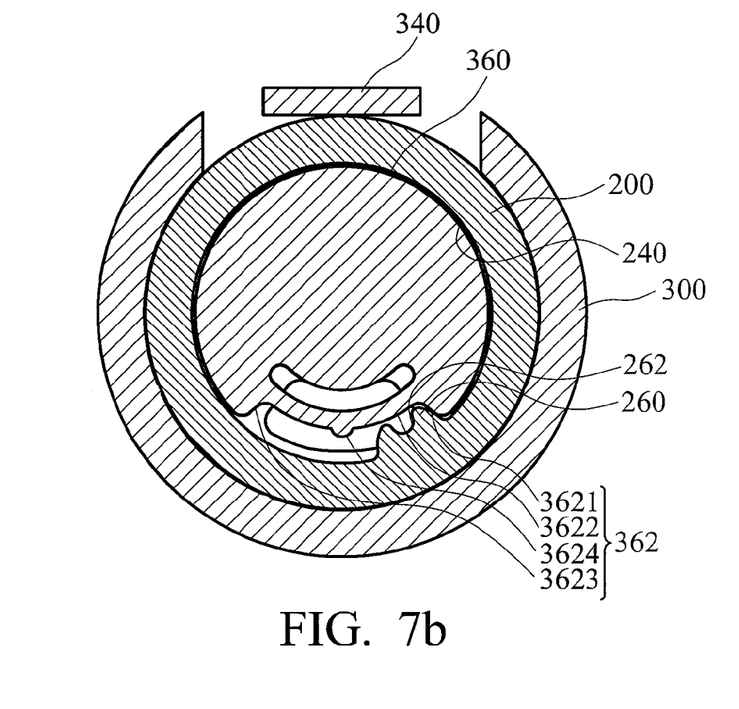
Figure 7C:
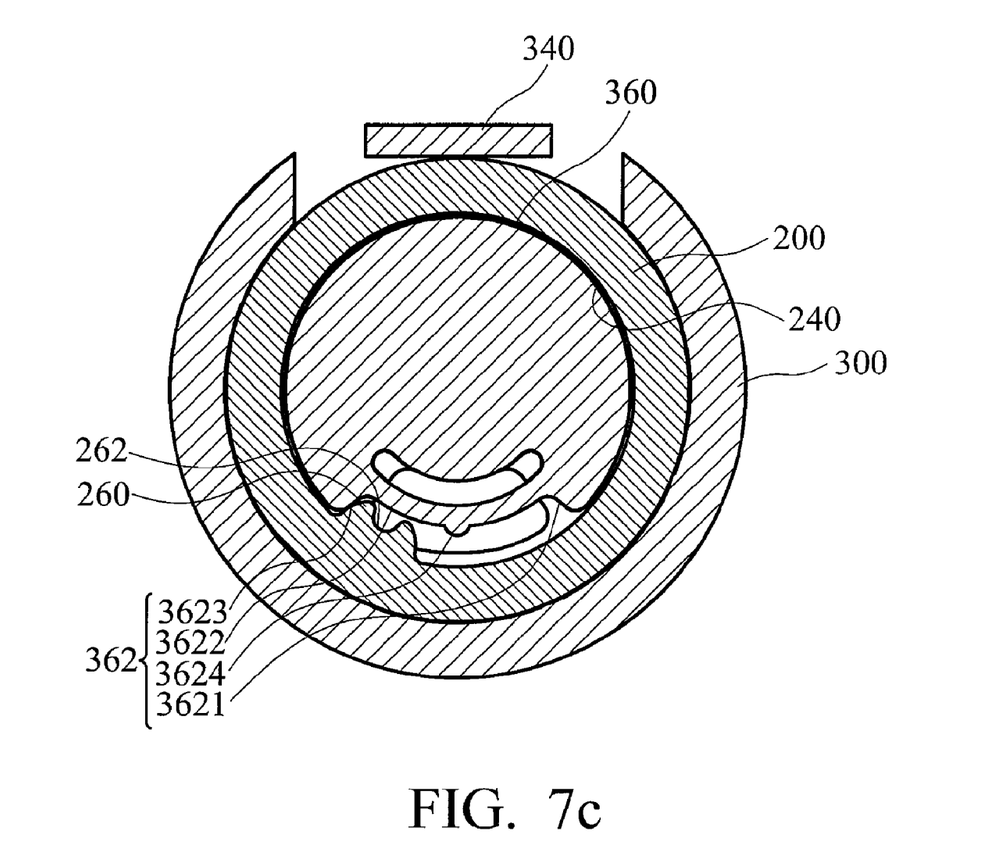
Figure 8:
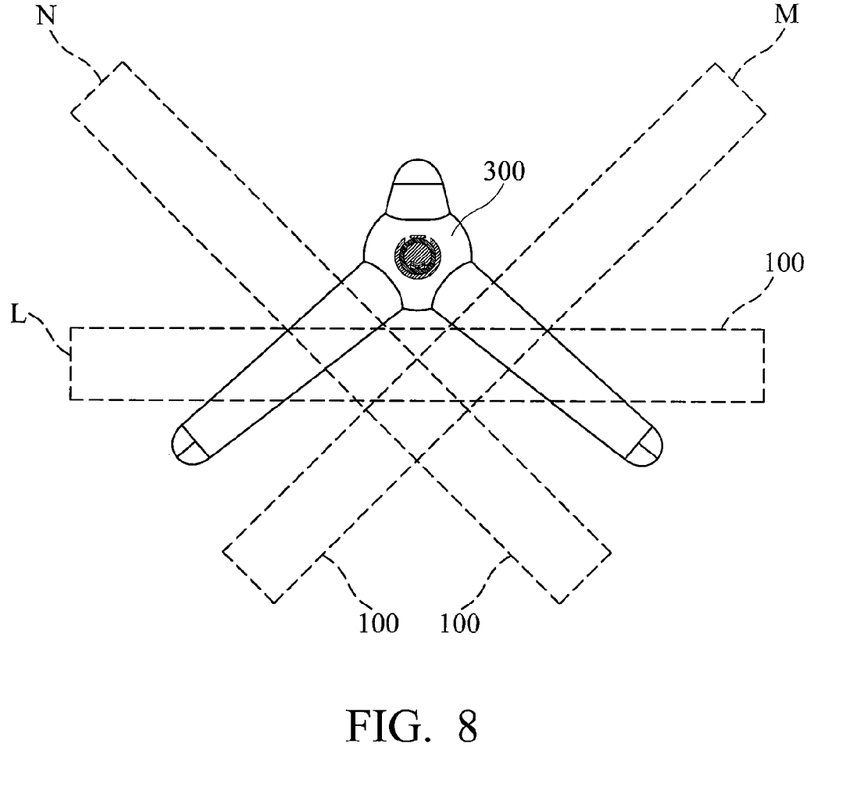
FIG. 8 depicts the positions of the main body of the display device corresponding to the positions of the supporting arm shown in FIGS. 7a to 7c.

When the supporting arm 200 is inserted into the positioning hole 320, the inner surface 240 of the supporting arm 200 holds the post 360 as shown in FIGS. 7a~7c. At this time, the protrusion 260 abuts the bottom surface 3622. In FIG. 7a, when the supporting arm 200 rotates relative to the positioning hole 320, the notch 262 of the protrusion 260 hold the projecting portion 3624 to position the supporting arm 200 at a predetermined position. Thus, the main body 100 is positioned at position L as shown in FIG. 8. In FIG. 7b, when the supporting arm 200 rotates, enabling the protrusion 260 to abut the first lateral surface 3621, the main body 100 is constrained at position M as shown in FIG. 8. In FIG. 7c, when the supporting arm 200 rotates, enabling the protrusion 260 to abut the second lateral surface 3623, the main body 100 is constrained at position N as shown in FIG. 8. The first lateral surface 3621 and the second lateral surface 3623 define the range of swivel of the supporting arm 200. In this embodiment, as the slot 220 also constrains the supporting arm 200 to swivel in another range, the width of the slot 220 must be larger than the distance between the first and second lateral surfaces 3621 and 3623.

The supporting arm 200 is joined to or detached from the base 300 by pressing the spring plate 340. The predetermined width of the slot 220 allows the supporting arm 200 to swivel, thus, the main body 100 of the display device 1000 swivels with respect to the positioning hole 320. The supporting arm 200 swivels within a range defined by the protrusion 260 and the post 360. The display device 1000 swivels, and can be easily assembled and disassembled.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
   a main body;
   a supporting arm being hollow, joined to the main body and having a slot, a periphery on which the slot is formed by a predetermined width and an inner surface on which a protrusion is disposed; and
   a base having a positioning hole, a spring plate disposed in the positioning hole and having a hook, and a post disposed in the positioning hole and having a recess, wherein when the hook engages the slot, the supporting arm engages the positioning hole and the supporting arm can rotate within a predetermined range; when the spring plate is deformed by pressure, the hook releases the slot, the supporting arm is thereby detached from the positioning hole; when the supporting arm engages the positioning hole, the supporting arm holds the post in such a manner that the inner surface abuts the post and the protrusion engages the recess.

2. The display device as claimed in claim 1, wherein the recess has a first lateral surface, a second lateral surface separated from the first lateral surface by a predetermined distance and a bottom surface connecting the first and second lateral surfaces; when the supporting arm holds the post and the inner surface abuts the post, the protrusion abuts the bottom surface; when the supporting arm rotates relative to the positioning hole, the protrusion abuts either the first lateral surface or the second lateral surface, which limits the supporting arm to rotate in a range defined by the first and second lateral surfaces.

3. The display device as claimed in claim 2, wherein the protrusion has a notch, and the bottom surface has a projecting portion; when the notch holds the projecting portion, the supporting arm is positioned at a specific position.

4. The display device as claimed in claim 3, wherein the projecting portion is disposed in the center of the bottom surface.

5. The display device as claimed in claim 2, wherein the slot is wider than the distance between the first lateral surface and the second lateral surface.

6. The display device as claimed in claim 1, wherein the protrusion extends along an axial direction of the supporting arm.

7. The display device as claimed in claim 1, wherein the supporting arm has a tube-like shape.

8. The display device as claimed in claim 1, wherein the post extends along an axial direction of the positioning hole.

9. The display device as claimed in claim 1, wherein the base has a plurality of ribs disposed on walls of the positioning hole, which extends along an axial direction of the positioning hole, and when the supporting arm is inserted into the positioning hole, the supporting arm abuts the ribs.

10. The display device as claimed in claim 1, wherein the spring plate extends along an axial direction of the positioning hole.

* * * * *